(12) United States Patent
Garcia

(10) Patent No.: US 6,659,027 B1
(45) Date of Patent: Dec. 9, 2003

(54) SEED AND FEED DISPENSER

(76) Inventor: Miguel Z Garcia, 470 Marble Hill Dr., Katy, TX (US) 77450

( * ) Notice: Subject to any disclaimer, the term of this patent is extended or adjusted under 35 U.S.C. 154(b) by 0 days.

(21) Appl. No.: 10/206,422

(22) Filed: Jul. 29, 2002

(51) Int. Cl.$^7$ ................................ A01C 5/02
(52) U.S. Cl. ................ 111/95; 222/505; 222/511
(58) Field of Search ................. 111/92, 93, 94, 111/95, 96; 222/191, 307, 511, 514, 162, 518, 505

(56) References Cited

U.S. PATENT DOCUMENTS

| | | | |
|---|---|---|---|
| 468,346 A | * 2/1892 | Johnson | 222/473 |
| 909,289 A | 1/1909 | Grisell et al. | |
| 1,233,352 A | 7/1917 | Helcher | |
| 1,264,029 A | * 4/1918 | Du Guay | 222/142.1 |
| 1,585,761 A | * 5/1926 | Canale | 141/345 |
| 1,813,131 A | * 7/1931 | Andrassy | 222/511 |
| 1,880,625 A | * 10/1932 | Wilmeth | 222/470 |
| 2,411,489 A | * 11/1946 | Williams | 222/142.8 |
| 2,549,233 A | * 4/1951 | Phillips | 222/145.4 |
| 2,687,598 A | 8/1954 | Calhoun | |
| 2,737,318 A | 3/1956 | Molnare | |
| 2,861,721 A | * 11/1958 | Race | 222/246 |
| 3,232,498 A | * 2/1966 | Bennett | 222/449 |
| 4,206,714 A | 6/1980 | Walsh | |
| 4,286,737 A | 9/1981 | Gallant | |
| 4,290,374 A | * 9/1981 | Maples | 111/92 |
| 4,471,889 A | * 9/1984 | Yelf | 222/175 |
| 4,614,160 A | * 9/1986 | Curlett | 111/96 |
| 4,760,807 A | * 8/1988 | Keller | 111/92 |
| 5,131,570 A | 7/1992 | Sawyer, III | |
| 5,339,994 A | * 8/1994 | Nuila | 222/175 |
| 5,431,115 A | 7/1995 | Auer | |
| 5,503,090 A | * 4/1996 | Guzan | 111/7.2 |
| 5,558,030 A | * 9/1996 | Ward | 111/7.2 |
| 6,267,269 B1 | * 7/2001 | Kates | 222/162 |
| 6,450,268 B1 | * 9/2002 | Taylor | 172/354 |
| 6,502,720 B2 | * 1/2003 | Schwederski | 221/268 |

* cited by examiner

*Primary Examiner*—Victor Batson
(74) *Attorney, Agent, or Firm*—Harrison & Egbert

(57) ABSTRACT

A dispenser for seed or feed having a tubular body with an interior volume and a dispensing opening at one end thereof, a handle affixed to the tubular body, a valve positioned within the interior volume adjacent the dispensing opening, and a button affixed to the handle and cooperative with the valve for opening the valve when the button is pushed and for closing the valve when the button is released. A line extends from the button through the interior of the handle and through the interior volume of the tubular body so as to be connected to the valve at the opposite end.

17 Claims, 3 Drawing Sheets

SEED AND FEED DISPENSER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention elates to devices for dispensing seed or feed. More particularly, the present invention relates to handheld manually operated devices for delivering seed or feed into a desired location on the earth.

BACKGROUND OF THE INVENTION

In the maintenance of lawns or other surfaces of the earth, due to the effects of fungus, insects and animals, bare spots or patches of dead grass must be constantly replaced. Whenever such bare spots or patches occur, it is necessary to reseed the earth. During the growing season of grass, it is usually required that the average homeowner replace or repair at least a few bare spots at different locations within the lawn. Generally, this requires first preparing the soil by scraping the soil to a depth of about one-quarter inch, and then depositing new soil onto the scraped soil area. Usually, this involves the use of a common scraping tool, usually having a short handle, such that the homeowner must bend down for scraping, and then hand distribute the seeds over the scraped area As can be appreciated, in the case of elderly people, or with people having back and knee problems, the task is very burdensome.

In other circumstances, it is desirable to disperse seed and other pellet-like objects onto the earth for the purpose of feeding animals. Since the animals will often appear or disappear from various locations, it is desirable to be able to distribute the seed in proper locations for the feeding of animals. In certain circumstances, it is desirable to put the seed in areas around the roots of trees. In other circumstances, it is desirable to reach into various crevices or other remote locations for positioning the seed in a desirable location for animal feeding.

In the past, various U.S. patents have issued relating to devices for dispensing seed and feed. For example, U.S. Pat. No. 5,131,570 describes a seed dispensing device for repairing divots. The seed dispensing device has an elongated tubular housing that contains seeds and also has a lower dispenser end. A spring-loaded rod is disposed at the lower end and includes an agitator at an upper end of the rod. A valve member releasably engages a valve seat in the lower end of the housing. When the rod is depressed against the ground, the valve is raised away from the seat and an agitator associated with this rod will loosen seeds to facilitate the discharge by gravity feed through the outlet of the housing.

U.S. Pat. No. 2,737,318, issued on Mar. 6, 1956, to A. W. Molnare, describes a fertilizing tool that has a telescoping portion and is also slotted for adjustment to the dispensing requirements. A spring-loaded rod is inserted into the interior of the telescoping body so as to allow for the remote actuation of the outlet openings and to facilitate the dispensing of seed therefrom. A rotatable knob is provided at the opposite end of this telescoping rod so as to allow for the opening and closing at the outlet end.

U.S. Pat. No. 4,206,714, issued on Jun. 10, 1980 to R. W. Walsh, describes a grass seeding device in the form of a telescoping tubular member with a storage hopper for grass seeds provided in the upper tube of the telescoping body. A valve is provided at the connection between the tubes of the telescoping body for controlling the flow of seeds from the storage hopper through the lower tube to the earth. The valve is a caged ball secured within the upper tube and an actuator secured in the lower tube. The lower end of the lower dispensing tube has teeth formed thereon for scoring the earth. When the tubular member is compressed along its axial length, the ball valve is actuated so as to enable a measured amount of grass seed to fall through the tubular member for deposit onto the ground.

U.S. Pat. Nos. 4,286,737, 1,233,352 and 909,289 teach vertically displaced valves for dispensing fertilizer and seeds. U.S. Pat. No. 4,286,737 describes a fertilizer dispenser having a handle with a gripping surface for actuating a valve. U.S. Pat. No. 909,289 describes another type of handle-actuated seed planter whereby a spring-loaded handle is connected for the opening and closing of the seed dispenser.

It is an object of the present invention to provide a dispenser which can dispenser seeds for planting purposes.

It is another object of the present invention to provide a dispenser that can dispenser seeds for the feeding of animals.

It is another object of the present invention to provide a seed and feed dispenser that is easy to carry and easy to store.

It is another object of the present invention to provide a seed and feed dispenser which is easy to use and makes the dispensing of seed a fun activity.

These and other objects and advantages of the present invention will become apparent from a reading of the attached specification and appended claims.

BRIEF SUMMARY OF THE INVENTION

The present invention is a dispenser for seed or feed comprising a tubular body having an interior volume and a dispensing opening at one end thereof a handle affixed to the tubular body, a ball positioned within the interior volume adjacent the dispensing opening arid a button affixed to the handle cooperative with the valve when the button is pushed and for closing the valve when the button is released.

In the present invention, the tubular body includes an outer tubular member and an inner tubular member in telescopic relationship with the outer tubular member. The handle is affixed to the exterior surface of the outer tubular member. The dispensing opening is at an end of the inner tubular member opposite the outer tubular member. A lid is removably affixed over an open end of the outer tubular member opposite the inner tubular member. The handle has a hollow structure with an interior communicating with the interior volume of the tubular body.

In the present invention, the button specifically includes a spring-loaded push button having a surface extending outwardly of the handle, and a line affixed to the push button and extending through the interior of the handle and also extending through the interior volume of the tubular body. The line is connected to the valve at the end opposite the push button.

In the present invention, the valve is a ball with a diameter greater than a diameter of the dispensing opening and an elastic means affixed to the ball and to a surface of the tubular body. This elastic means serves to urge the ball into a position covering the dispensing opening in the interior volume of the tubular body. The line from the button is connected to a surface of the ball. The elastic means includes a rubber band at one end connected to a ball and a hook attached to an opposite end of the rubber band. The hook is engaged with the outer surface of the dispensing opening.

In the present invention, a sling has an end affixed to the outer tubular member of the tubular body. The sling will extend outwardly from the tubular body so as to be in a suitable position for placement around the shoulder or around the arm of the user.

DETAILED DESCRIPTION OF THE INVENTION

Figure 1:
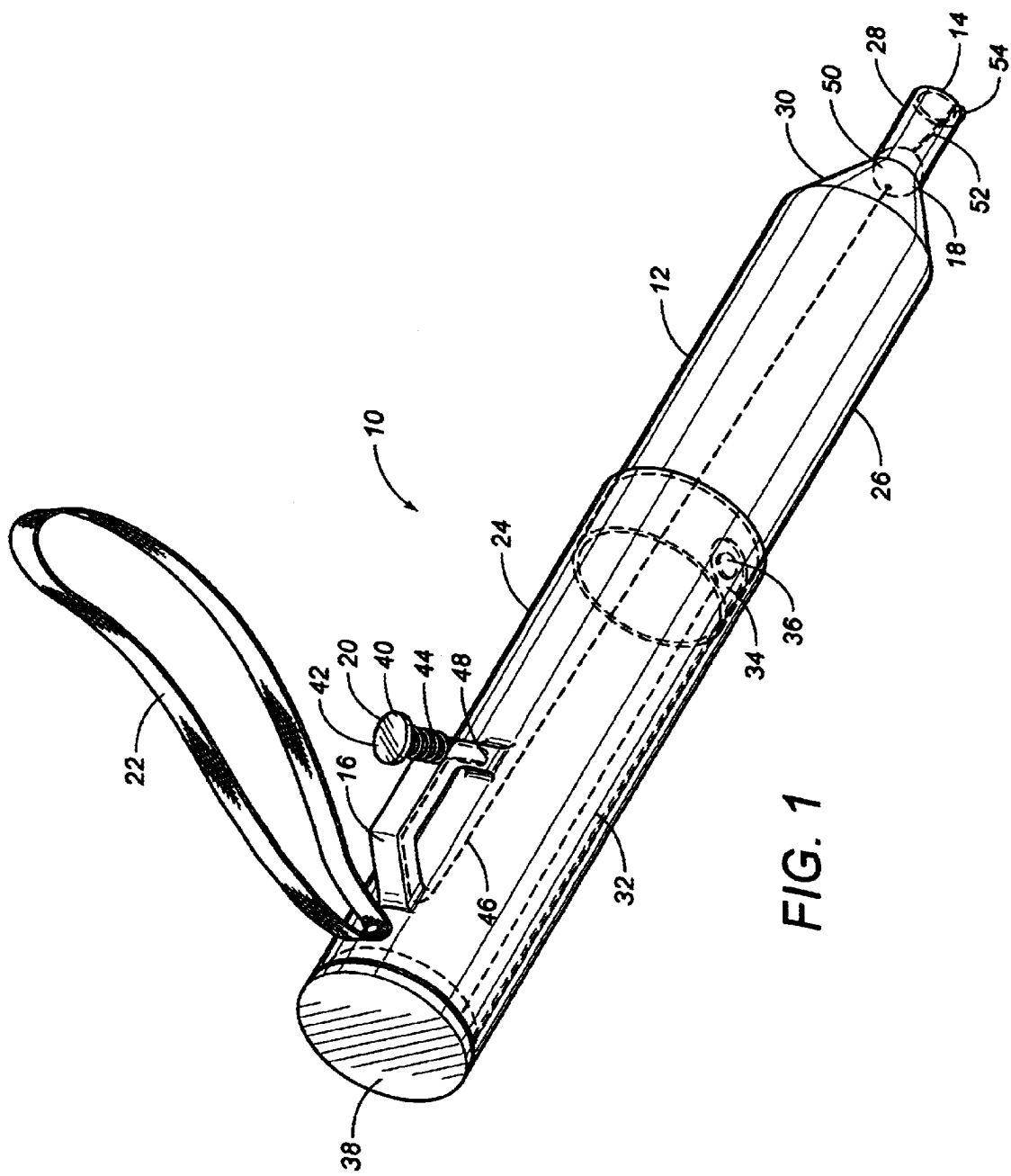
FIG. 1 is a perspective view of the seed and feed dispenser of the present invention.

Referring to FIG. 1, there is shown the seed and feed dispenser 10 in accordance with the teachings of the present invention. This seed and feed dispenser 10 includes a tubular body 12 having an interior volume and a dispensing opening 14 at one end of the tubular body 12. A handle 16 is affixed to the tubular body and extends outwardly therefrom. A valve 18 is positioned within the interior volume of the tubular body 12 generally adjacent to the dispensing opening 14. An actuator 20 is affixed to the handle 16 and is cooperative with the valve 18 for opening and closing the valve 18. A sling 22 is affixed to the tubular body 12 and extends outwardly therefrom.

In the present invention, the tubular body 12 includes an outer tubular member 24 and an inner tubular member 26. The inner tubular member 26 is in telescopic relationship with the outer tubular member 24. The handle 16 is affixed to the exterior surface of the outer tubular member 24. The dispensing opening 14 is located at the end of the inner tubular member 26 opposite the outer tubular member 24. A small tubular section 28 extends from a funnel-like section 30 at the end of the inner tubular member 26. The valve 18 is disposed at the bottom of the funnel-like section 30 in proximity to the inner opening of the small diameter tubular section 28 spaced from the dispensing opening 14.

The outer tubular member 24 includes a guide channel 32 formed in an interior surface thereof. Guide channel 32 extends longitudinally along the length of the outer tubular member 24. A locking slot 34 is formed at the end of the guide channel 32. Similarly, the inner tubular member 26 includes a protrusion 36 extending outwardly of the exterior surface of the inner tubular member 26. The protrusion 36 is a tab which is engagable within the locking slot 34 of the guide channel 32 of the outer tubular member 24. The tab 36 can be freely movable along the length of the guide channel 32. In the present invention, when it is desired to fix the inner tubular member 26 with respect to the outer tubular member 24, the tab 36 is pulled downwardly so as to enter the locking slot 34. The tubular members 24 and 26 are rotated relative to each other so that the protrusion 36 will properly reside in fixed relationship within the locking slot 34. In this outwardly telescoped position, the seed and feed dispenser 10 is in a proper orientation for dispensing. A lid 38 is removably affixed over the opposite end of the outer tubular member 24 from the inner tubular member 26. The lid 38 can be suitably removed from its position so that seed or feed can be inserted into the interior volume of the tubular body 12.

As can be seen in FIG. 1, the handle 16 is affixed to the exterior surface of the outer tubular member 24. The handle 16 has a generally hollow structure with an interior communicating with the interior volume of the tubular body 12.

The actuator 20 is a spring-loaded push button 40 having a surface 42 extending outwardly of the handle 16. Spring 44 will be interposed between the surface 42 and the exterior surface of the handle 16 so as to urge the push button 40 into its outermost position. A line 46 has one end connected to the interior end 48 of push button 40 within the handle 16. The line 46 will extend through the hollow interior of the handle 16 and through the interior volume of the tubular body 12 so as to be connected to the valve 18.

The valve 18 includes a ball 50 with a diameter greater than that of the dispensing opening 14 or of the entrance to the small diameter tubular section 28. In FIG. 1, it can be seen that the ball 50 is juxtaposed over the entrance to the small diameter tubular section 28 at the bottom of the funnel-like section 30. An elastic member 52 is affixed to the ball 50 and to a surface of the tubular body 12. This elastic member 52 serves to urge the ball 50 into its position covering the dispensing opening 14 so as to prevent seed or feed from passing therethrough. The line 46 has its opposite end from the push button 40 connected to the ball 50.

In the present invention, the elastic member 52 is a rubber band having one end connected to the ball 50. The opposite end of the rubber band is attached to a hook 54 engaged with an outer surface of the dispensing opening 14

In normal use, when it is desired to dispense seed or feed from the interior volume of the tubular body 12, the surface 42 of the button 40 is depressed downwardly toward the handle 16. This will cause the interior portion 48 of the push button 40 to pull the line 46 downwardly into the handle 16. Simultaneously, this force will be transmitted through the line 46 so as to pull the ball 50 from its position covering the dispensing opening 14. When the button 40 is released, the elastic member 52 will pull the ball 50 back to its position covering the dispensing opening 14 so that seed is prevented from being accidentally dispensed outwardly of the dispensing opening 14.

Figure 2:
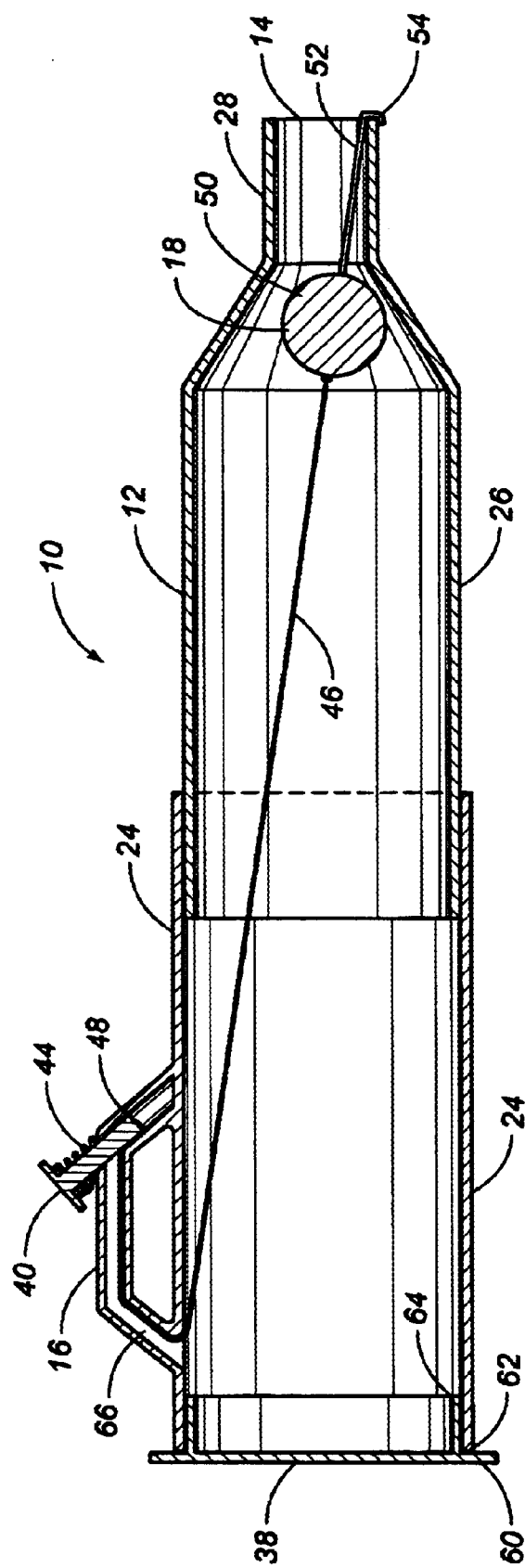
FIG. 2 is a cross-sectional view of the seed and feed dispenser of the present

FIG. 2 shows the cross-sectional view of the seed and feed dispenser 10 of the present invention. Also, in FIG. 2, the configuration of the present invention is particularly illustrated which the valve 18 has been opened so as to allow for the dispensing of seed and feed through the dispensing opening 14.

In FIG. 2, it can be seen that the tubular body 12 has outer tubular member 24 and inner tubular member 26 arranged in telescopic relationship. The valve 18 includes ball 50 which has rubber band 52 with one end attached to the ball 50 and an opposite end attached to the hook 54 engaged with the outer surface of the dispensing opening 14.

In FIG. 2, the push button 40 has been suitably depressed so as to compress spring 44. The inwardly extending portion 48 of the shank of push button 40 has line 46 attached thereto. This inward movement of the push button 40 draws the line 46 toward the handle 16 thereby lifting the ball 50 from its position covering the entrance to the small diameter tubular section 28 and to the dispensing opening 14. In this orientation, seed can pass freely outwardly of the dispensing opening 14 when the dispenser 10 is directed toward the earth. The seed will pass through the dispensing opening 14 by gravity feed.

In FIG. 2, it can be seen that the cover 38 has a wide diameter portion covering the open end 62 of the outer tubular member 24. A cylindrical portion 64 is inserted into the interior of the outer tubular member 24 so as to reside in generally friction-fit relationship therewith.

FIG. 2 also shows that the handle 16 has a hollow interior 66. As a result, the line 46 can be circuitously routed through the interior 66 of handle 16.

Figure 3:
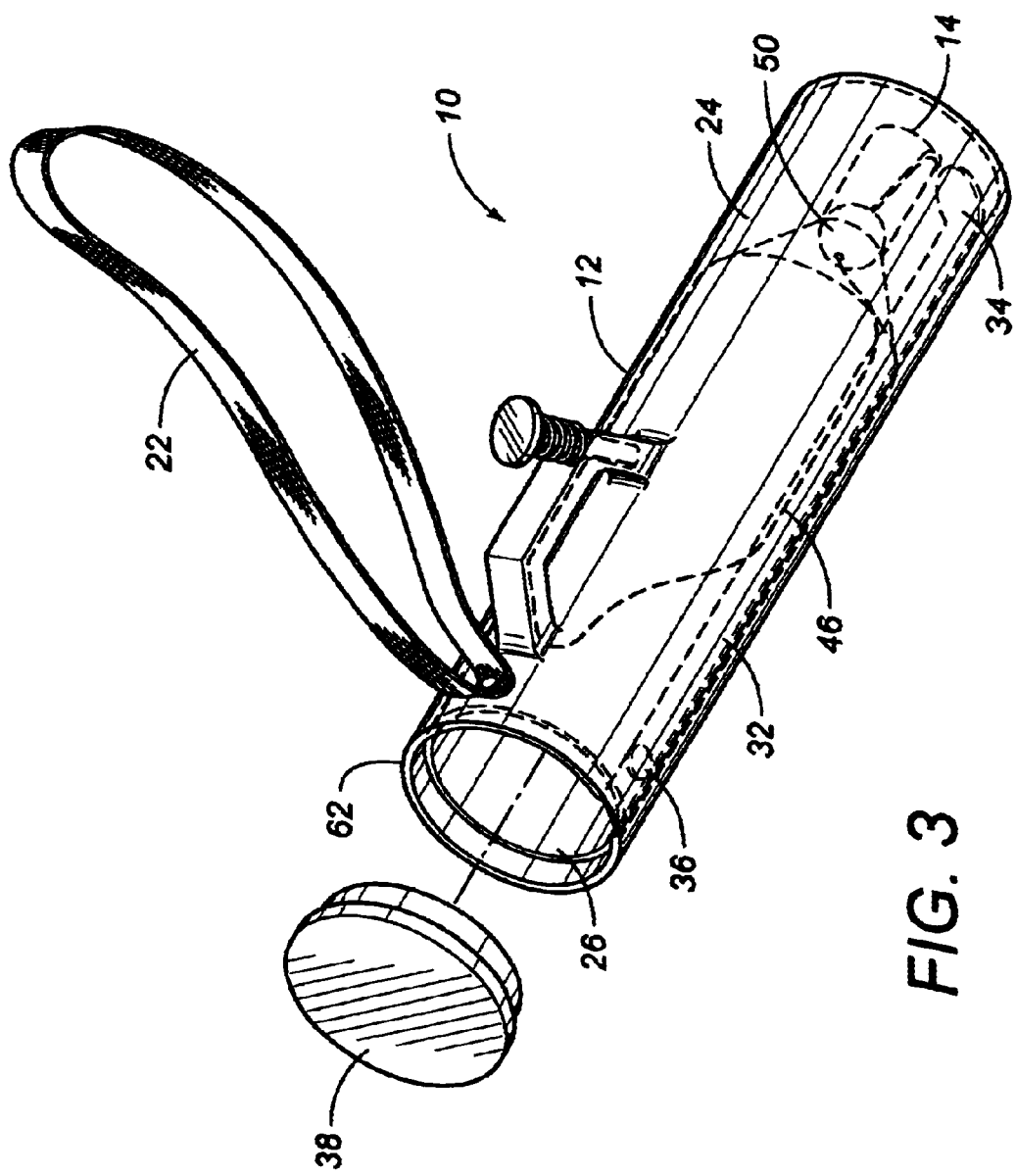
FIG. 3 is a perspective view of the seed and feed dispenser of the present invention in a collapsed position for storage.

FIG. 3 shows how the seed and feed dispenser 10 of the present invention can be manipulated for storage. In particular, the protrusion 36 formed on the inner tubular member 26 has been pushed along the guide channel 32 so as to reside in proximity with the end 62 of the outer tubular member 24. The protrusion 36 will travel along the guide channel 32 by being rotated from its locked position within the locking slot 34. The lid 38 can be removed from the end 62 or it can be stored in a closed position over the end 62.

In the collapsed position shown in FIG. 3, the line 46 will become slackened within the interior volume of the tubular body 12. However, accidental spillage of seed or feed is prevented since the ball 50 is retained in its position closing the dispensing opening 14 by virtue of the action of the elastic band 52. The seed and feed dispenser 10 can be stored or transported in this collapsed position.

The foregoing disclosure and description of the invention is illustrative and explanatory thereof. Various changes in the details of the illustrated apparatus construction can be made within the scope of the appended claims without departing from the true spirit of the invention. The present invention should only be limited by the following claims and their legal equivalents.

I claim:

1. A dispenser for seed or feed comprising:
a tubular body having an interior volume, said tubular body having a dispensing opening at one end thereof;
a handle affixed to said tubular body, said handle being a hollow structure having an interior communicating with said interior volume of said tubular body;
a valve positioned within said interior volume adjacent said dispensing opening; and
a button means affixed to said handle and cooperative with said valve for opening said valve when said button means is pushed and for closing said valve when said button means is released, said button means comprising:
a spring-loaded push button having a surface extending outwardly of said handle; and
a line affixed to said push button and extending through said interior of said handle and extending through said interior volume of said tubular body, said line connected to said valve at an end opposite said spring-loaded push button.

2. The dispenser of claim 1, said tubular body comprising:
an outer tubular member; and
an inner tubular member in telescoping relationship with said outer tubular member.

3. The dispenser of claim 2, said handle affixed to an exterior surface of said outer tubular member, said dispensing opening being at an end of said inner tubular member opposite said outer tubular member.

4. The dispenser of claim 2, said tubular member further comprising:

a lid removably affixed over an open end of said outer tubular member opposite said inner tubular member.

5. The dispenser of claim 1, said valve comprising:
a ball having a diameter greater than a diameter of said dispensing opening; and
an elastic means affixed to said ball and to a surface of said tubular body, said elastic means for urging said ball into a position covering said dispensing opening.

6. The dispenser of claim 5, said elastic means comprising:
a rubber band connected to said ball; and
a hook attached to an opposite end of said rubber band, said hook engaged with an outer surface of said dispensing opening.

7. The dispenser of claim 1, further comprising:
a sling having an end affixed to said tubular body, said sling extending outwardly of said tubular body.

8. A dispenser for seed or feed comprising:
a tubular body having an interior volume, said tubular body having a dispensing opening at one end thereof, said tubular body comprising:
outer tubular member; and
an inner tubular member in telescopic relationship with said outer tubular member, said outer tubular member having a guide channel formed in an interior surface thereof, said inner tubular member having a protruding member received within said guide channel of said outer tubular member;
a handle affixed to said tubular body;
a valve positioned within said interior volume adjacent said dispensing opening; and
an actuator means interconnected to said tubular body and cooperative with said valve for opening and closing said valve.

9. The dispenser of claim 8, said guide channel having a locking slot formed at an end of said outer tubular member, said protruding member being a tab extending outwardly of said inner tubular member and engageable within said locking slot so as to releasably fix a position of said outer tubular member with respect to said inner tubular member.

10. The dispenser of claim 8, said actuator means comprising:
a spring-loaded push button having a surface extending outwardly of said handle; and
a line affixed to said push button and extending through an interior of said handle and extending through said interior volume of said tubular body so as to be connected at an end opposite to said valve.

11. The dispenser of claim 8, said valve comprising:
a ball having a diameter greater than a diameter of said dispensing opening; and
an elastic means affixed to said ball and to a surface of said tubular body, said elastic means for urging said ball into a position covering said dispensing opening and said interior volume of said tubular body.

12. The dispenser of claim 8, said handle being affixed to an exterior surface of said outer tubular member, said dispensing opening being at an end of said inner tubular member opposite said outer tubular member, said handle being of a hollow structure having an interior communicating with said interior volume of said tubular body.

13. A dispenser for seed or feed comprising:
a tubular body having an interior volume, said tubular body having a dispensing opening at one end thereof;
a handle affixed to said tubular body;

a valve positioned within said interior volume adjacent said dispensing opening, said valve comprising:
  a ball having a diameter greater than a diameter of said dispensing opening; and
  an elastic means affixed to said ball and to a surface of said tubular body, said elastic means for urging said ball into a position covering said dispensing opening and said interior volume of said tubular body; and
  an actuator means interconnected to said tubular body and cooperative with said valve for opening and closing said valve.

14. The dispenser of claim 13, said actuator means comprising:
  a spring-loaded push button having a surface extending outwardly of said handle; and
  a line affixed to said push button and extending through an interior of said handle and extending through said interior volume of said tubular body, said line connected at an opposite end to said ball.

15. The dispenser of claim 13, said elastic means comprising:
  a rubber band connected to said ball; and
  a hook attached to an opposite end of said rubber band, said hook engaged with an outer surface of said dispensing opening.

16. The dispenser of claim 13, said handle being a hollow structure having an interior communicating with said interior volume of said tubular body.

17. The dispenser of claim 13, said tubular body comprising:
  an outer tubular member and an inner tubular member in telescopic relationship with said outer tubular member, said handle being affixed to an exterior surface of said outer tubular member, said dispensing opening being at an end of said inner tubular member opposite an end of said outer tubular member.

* * * * *